(12) United States Patent
Sosa

(10) Patent No.: US 10,542,765 B2
(45) Date of Patent: Jan. 28, 2020

(54) APPARATUS FOR MAINTAINING BEVERAGES IN INDIVIDUAL CONTAINERS IN A SEMI-FROZEN STATE

(71) Applicant: Gregory Sosa, Bayshore, NY (US)

(72) Inventor: Gregory Sosa, Bayshore, NY (US)

( * ) Notice: Subject to any disclaimer, the term of this patent is extended or adjusted under 35 U.S.C. 154(b) by 121 days.

(21) Appl. No.: 15/499,340

(22) Filed: Apr. 27, 2017

(65) Prior Publication Data

US 2018/0310589 A1    Nov. 1, 2018

(51) Int. Cl.
| | |
|---|---|
| *A23G 9/00* | (2006.01) |
| *A23G 9/10* | (2006.01) |
| *F25D 31/00* | (2006.01) |
| *A23G 9/04* | (2006.01) |
| *A23G 9/22* | (2006.01) |

(52) U.S. Cl.
CPC ............ *A23G 9/106* (2013.01); *A23G 9/045* (2013.01); *A23G 9/228* (2013.01); *F25D 31/007* (2013.01)

(58) Field of Classification Search
CPC .......... A23G 9/106; A23G 9/045; A23G 9/08; A23G 9/228; F25D 31/007
See application file for complete search history.

(56) References Cited

U.S. PATENT DOCUMENTS

| | | | | |
|---|---|---|---|---|
| 1,295,684 | A * | 2/1919 | Bouquin | A23G 9/106 366/204 |
| 4,637,221 | A * | 1/1987 | Levine | A23G 9/28 366/286 |
| 5,816,455 | A * | 10/1998 | Alpers | A23G 9/228 222/388 |
| 6,364,226 | B1 * | 4/2002 | Kubicko | A47J 43/06 241/282.1 |

* cited by examiner

*Primary Examiner* — Anshu Bhatia
(74) *Attorney, Agent, or Firm* — Epstein Drangel LLP; Robert L. Epstein

(57) ABSTRACT

The freezer enclosure is maintained at a temperature equal to or less than the freezing point of the beverage. Gears, rotatably mounted on a shelf, include sets of aligned interconnected gears and gears connecting the gears in the sets. A drive gear is mounted to and moveable with the shaft of a motor. The drive gear is connected to one of the gears in one of the sets to drive the gears in each set. A coaster-shaped member is moveable with the gears and supports a bottle which contains the beverage. The bottle is locked to the member such that it rotates with the member. The motor continuously rotates the bottle to agitate the beverage to keep the beverage from freezing. Internal baffles in the bottle increase the agitation resulting from the rotation.

20 Claims, 10 Drawing Sheets

APPARATUS FOR MAINTAINING BEVERAGES IN INDIVIDUAL CONTAINERS IN A SEMI-FROZEN STATE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to apparatus for retaining and dispensing chilled beverages and more particularly, to a freezer capable of retaining beverages in individual containers in a semi-frozen or "slushy" state for immediate dispensing at commercial establishments.

2. Description of Prior Art Including Information Disclosed Under 37 CFR 1.97 and 1.98

Conventional refrigerators and freezers for storing foods of various kinds are well known for use in both residential and commercial environments. Refrigerators designed specifically for the storage of beverages, such as soda, beer and wine, are also known. Those beverage refrigerators can be set to any desired temperature above the freezing point of the beverage being stored. Some beverage refrigerators even have different sections for different types of beverages which can be maintained at different temperature levels.

Certain types of beverages, particularly those with alcoholic content, are preferably consumed when they are very cold, and considered best served at a temperature at or less than the freezing point of the beverage. However, storage of liquid below the freezing point in a conventional refrigerator or freezer will result in the liquid freezing solid. Freezing a beverage will ruin the beverage or at least make the beverage undrinkable until the beverage returns to the liquid state. Further, if the beverage contains a liquid such as water which expands when frozen, freezing the beverage to a solid state in a container may cause the container to rupture.

In order to meet the demand for very cold beverages, it would be desirable to have an apparatus capable of maintaining beverages at a temperature at or below the freezing point of the beverage, but which does so in a manner which does not cause the beverage to freeze to a solid state.

The types of beverages which are best consumed in the semi-frozen or "slushy" state are often sold for consumption at clubs, bars and restaurants, or for take-out at convenience stores, gas stations, highway rest stops or the like. In those situations, the beverages must be available for immediate distribution and consumption. There is no time to chill the beverages to the desired low temperature. Further, it is desirable that the chilled beverage be available in individual containers such that additional packaging of the beverage is not required. Accordingly, it is desirable not only to have an apparatus that can chill beverages in individual containers to the desired temperature, it is necessary that apparatus be capable of continually maintaining the beverage in the individual containers in the semi-frozen state such that the packaged beverage is always available for immediate distribution and consumption.

BRIEF SUMMARY OF THE INVENTION

It is therefore a prime object of the present invention to provide apparatus for maintaining beverages in individual containers in a semi-frozen state.

It is another object of the present invention to provide apparatus for continually maintaining beverages in individual containers at or below the freezing point of the beverage without freezing.

It is another object of the present invention to provide apparatus for maintaining beverages in individual containers in a semi-frozen state such that the beverages are immediately available for distribution and consumption.

It is another object of the present invention to provide apparatus for maintaining beverages in individual containers in a semi-frozen state which agitates the beverage to prevent the beverage from freezing solid.

It is another object of the present invention to provide apparatus for maintaining beverages in individual containers in a semi-frozen state by continually rotating the container with the beverage to agitate the beverage in the container.

It is another object of the present invention to provide apparatus for maintaining beverages in individual containers in a semi-frozen state using a motor mechanically linked to the beverage container support.

It is another object of the present invention to provide apparatus for maintaining beverages in individual containers in a semi-frozen state in which the mechanical linkage includes a shaft connected between the motor and a gear upon which the beverage container is supported.

It is another object of the present invention to provide apparatus for maintaining beverages in individual containers in a semi-frozen state in which the mechanical linkage includes a shaft connected between the motor and a set of aligned interconnected gears upon which beverage containers are individually supported.

It is another object of the present invention to provide apparatus for maintaining beverages in individual containers in a semi-frozen state in which the mechanical linkage includes a shaft connected between the motor and multiple sets of aligned interconnected gears upon which beverage containers are individually supported.

It is another object of the present invention to provide apparatus for maintaining beverages in individual containers in a semi-frozen state including spaced shelves, each of which shelves carry multiple sets of aligned interconnected gears upon which beverage containers are individually supported.

It is another object of the present invention to provide apparatus for maintaining beverages in individual containers in a semi-frozen state which utilizes specially configured beverage containers which interlock with coaster-like beverage bottle support members attached to and rotatable with the gears.

It is another object of the present invention to provide apparatus for maintaining beverages in individual containers in a semi-frozen state which utilizes specially configured beverage containers having one or more internal baffles to increase the agitation resulting from the rotation of the beverage container.

In general, the above objects are achieved by the present invention which relates to apparatus for maintaining a beverage in a semi-frozen state. The apparatus includes an enclosure and means for maintaining the interior of the enclosure at a temperature equal to or less than the freezing point of the beverage. A motor is provided. A shaft is connected to and rotated by the motor. Gear means are connected to and rotated by the shaft. Means moveable with the gear means are adapted to support the beverage in a container. Means are provided to actuate the motor to continually rotate the beverage container.

The gear means includes a set of aligned interconnected gears. The apparatus also includes a drive gear mounted to and moveable with the shaft. The drive gear is connected to one of the gears in the set to drive the gears in the set.

The gear means may also include a first set of aligned interconnected gears and a second set of aligned interconnected gears. In that case, the drive gear is connected to one of the gears in each set to drive the gears in each set.

The gear means may also include a first set of aligned interconnected gears, a second set of aligned interconnected gears and a gear connecting one of the gears in the first set of gears and one of the gears in the second set of gears. In that case, the drive gear is connected to one of the gears in one of the sets to drive the gears in each set.

The gear means may also include first gear means including a first set of aligned interconnected gears, a second set of aligned interconnected gears and a gear connecting one of the gears in the first set of gears of the first gear means and one of the gears in the second set of gears of the first gear means. The gear means also includes second gear means including a first set of aligned interconnected gears, a second set of aligned interconnected gears and a gear connecting one of the gears in the first set of gears of the second gear means and one of the gears in the second set of gears of the second gear means. In that case, the drive gear is connected to one of the gears in one of the sets to drive the gears in each set.

The beverage container support means comprises a coaster-shaped member mounted on and rotatable with the gear means. The beverage container preferably takes the form of a bottle.

Means are provided for preventing the bottle from rotating relative to the bottle support member. The rotation preventing means includes a protrusion in the form of a fin on one of the member and the bottle, and a recess adapted to receive the protrusion or fin in the other of the member and the bottle.

Further, the bottle is provided with one or more internal baffles to increase the agitation of the beverage in the bottle resulting from the rotation of the bottle.

The enclosure includes a door. The motor is actuated only when the door is closed such that rotation of the beverage container does not take place while a beverage container is being removed from the enclosure.

The apparatus also includes one or more shelves. The gear means are mounted for rotation on the shelves. The shelves are slideably mounted in the enclosure such that when they are situated completely within the enclosure the drive gear engages and rotates the gear means.

In one embodiment, a reversible motor is provided. Means are provided to control the motor to repeatedly rotate the beverage containers in one direction and then in another direction.

In accordance with another aspect of the present invention, apparatus is provided for maintaining a beverage in a semi-frozen state. The apparatus includes an enclosure and means for maintaining the interior of the enclosure at a temperature equal to or less than the freezing point of the beverage. A motor is provided. A shaft is connected to and rotated by the motor. Gear means are provided including a first set of aligned interconnected gears, a second set of aligned interconnected gears and a gear connecting one of the gears in the first set of gears and one of the gears in the second set of gears. A drive gear is mounted to and moveable with the shaft. The drive gear is connected to one of the gears in one of the sets to drive the gears in each set. Means moveable with the gear means are adapted to support the beverage in a container. Means are provided for actuating the motor to continually rotate the beverage container.

In accordance with another object of the present invention, apparatus is provided for maintaining a beverage in a semi-frozen state. The apparatus includes an enclosure and means for maintaining the interior of the enclosure at a temperature equal to or less than the freezing point of the beverage. A motor is provided. A shaft is connected to and rotated by the motor. Gear means are provided including a first gear means including a first set of aligned interconnected gears, a second set of aligned interconnected gears and a gear connecting one of the gears in the first set of gears of the first gear means and one of the gears in the second set of gears of the first gear means. The gear means also includes second gear means including a first set of aligned interconnected gears, a second set aligned interconnected gears and a gear connecting one of the gears in the first set of gears of the second gear means and one of the gears in the second set of gears of the second gear means. A drive gear is mounted to and moveable with the shaft. The drive gear is connected to one of the gears in one of the sets to drive the gears in each set. Means moveable with the gear means are adapted to support the beverage in a container. Means are provided for actuating the motor to continually rotate the beverage container.

BRIEF DESCRIPTION OF THE SEVERAL VIEWS OF DRAWINGS

To these and to such other objects that may hereinafter appear, the present invention relates to apparatus for maintaining beverages in a semi-frozen state as described in detail in the following specification and recited in the annexed claims, taken together with the accompanying drawings, in which like numerals refer to like parts and in which:

DETAILED DESCRIPTION OF THE INVENTION

Figure 1:
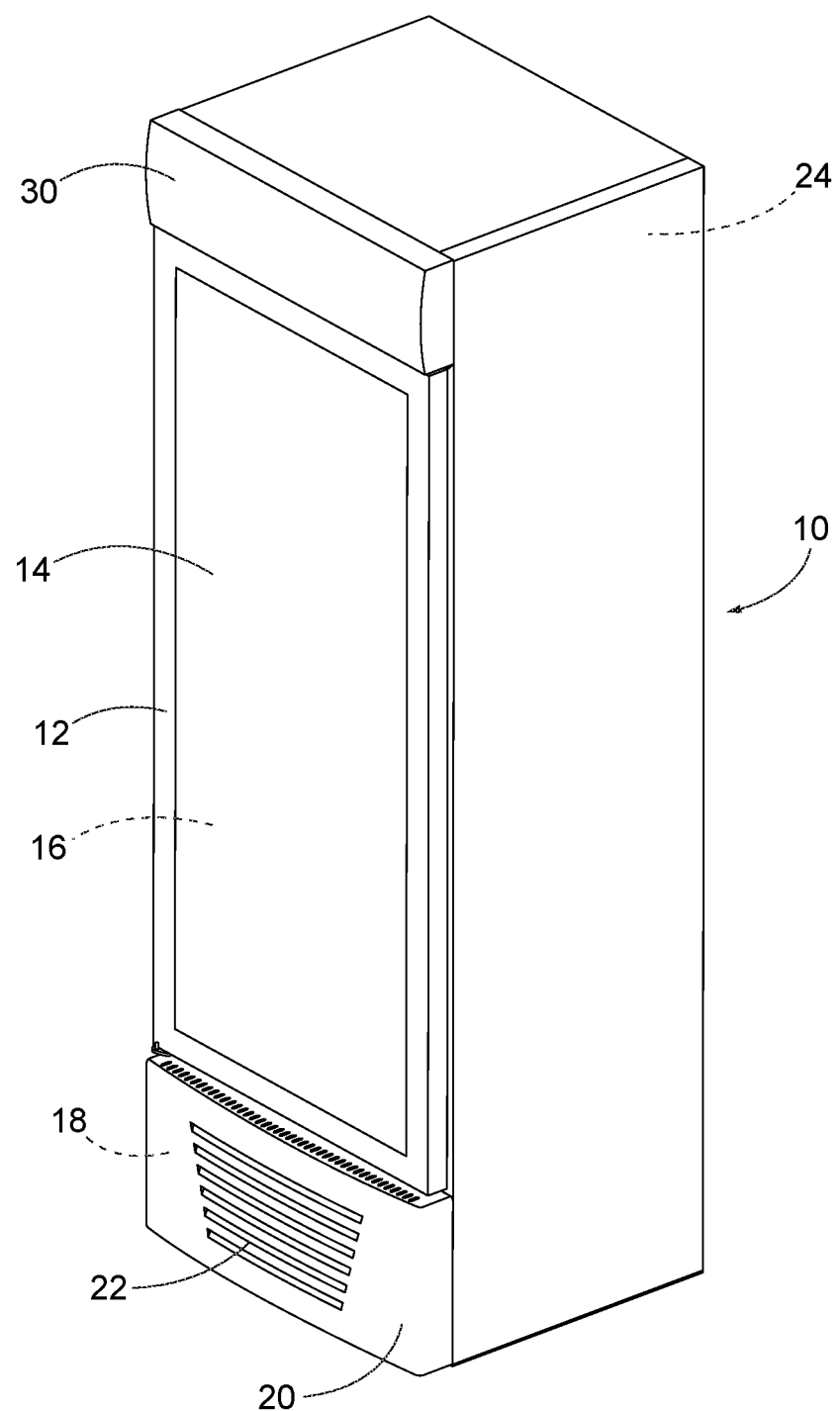
FIG. 1 is a perspective view of the exterior of the apparatus of the present invention.

As seen in FIG. 1, the apparatus of the present invention is freezer including a generally rectangular housing 10 with a hinged front door 12 preferably including a glass window 14. Window 14 allows observation of the contents of the freezer without having to open the door, thereby reducing the number of times the door must be opened, and consequently the amount of power required to keep the freezer at a temperature at or below the freezing point of a liquid in the form of a beverage therein.

Housing 10 and door 12 define the interior enclosure 16 of the freezer. The mechanical and electrical components of the freezer are situated in a bottom compartment 18 below enclosure 16. A grille 20 is provided to cover the front of compartment 18. Grille 20 has a plurality of air vents 22 which allow for dissipation of the heat generated by the mechanical and electrical components from compartment 18.

Above enclosure 16 is a top compartment 24 within which an evaporation fan 26 and a fan motor 28 are situated. An opening in the top of the enclosure 16 (not shown) is provided such that fan 26 can circulate the air within the enclosure to maintain a uniform temperature throughout the interior space and reduce condensation on the enclosure walls and glass window 14. A cover member 30 is provided to close the front of compartment 22.

Figure 2:
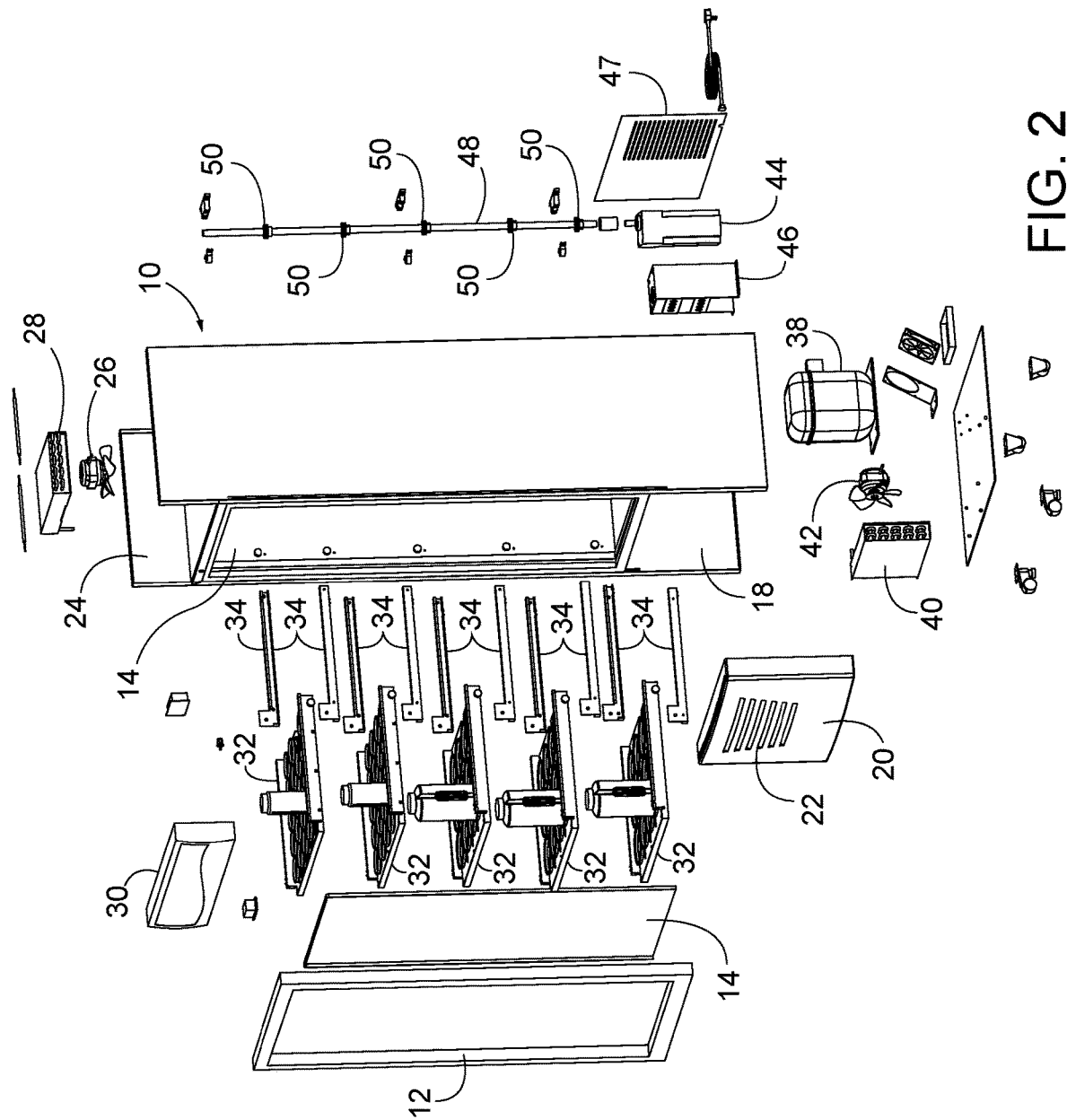
FIG. 2 is an exploded perspective view of the apparatus showing the internal components.

FIG. 2 shows the internal components of the freezer. The enclosure 16 has five shelves 32 each of which is mounted between a pair of spaced roller guides 34. When door 12 is open, the guides allow each of the shelves to slide out of the enclosure to provide access to all of beverage bottles 36 located on the shelf.

Situated within bottom compartment 18 is a compressor 38, a box 40 containing the electrical controls for the compressor, the motor 28, and a fan 42 which circulates the air in compartment 18. Towards the rear of the compartment is situated a motor 44 supported in a housing 46. A vented rear cover 47 is provided to close the rear of compartment 18.

A vertically extending shaft 48 is connected to the output shaft of motor 44. Shaft 48 extends along the interior surface of the rear wall of the enclosure, from the motor to at least the level of the top shelf 32. Fixed to and spaced along shaft 48 are five drive gears 50, one for each shelf 32.

Figure 3:
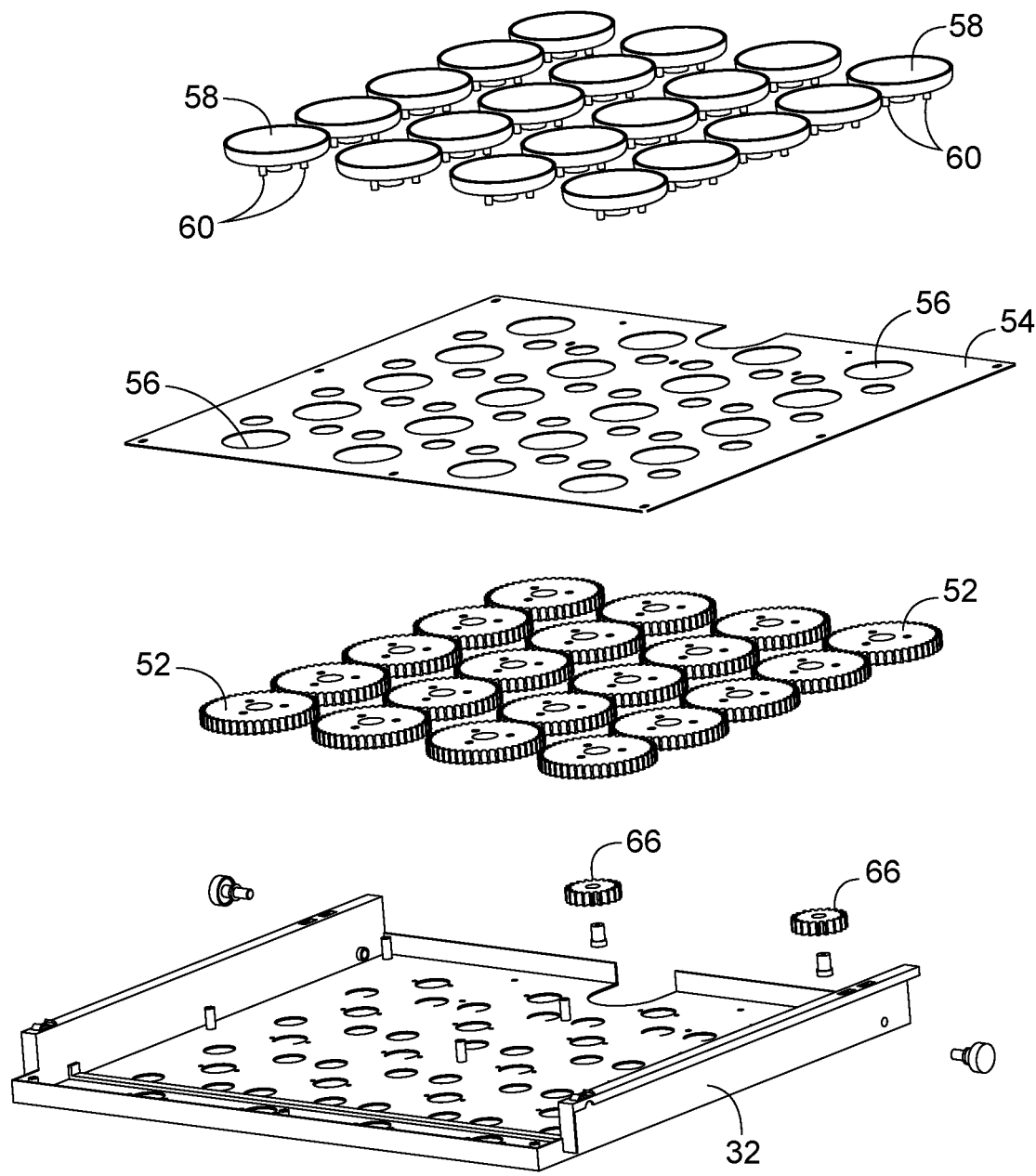
FIG. 3 is an exploded perspective view of a shelf of the apparatus showing the arrangement of the gears and coaster-shaped bottle support members.

FIG. 3 shows a detail of one of the shelves 32. The shelf carries several spaced parallel sets of gears 52. Each gear in the sets is individually rotatably mounted on the shelf for independent rotation about a shaft (not shown). Each gear set includes a row of aligned interconnected gears.

Situated on top of the gear sets is a planar template 54. Template 54 has sets of large spaced openings 56, each opening being aligned with a different one of the gears 52. Located above template 54, aligned with each opening 56 in the template, is a separate coaster-like shaped bottle support member 58.

Each bottle support member 58 has three spaced cylindrical protrusions 60 extending downwardly from its bottom surface. The protrusions 60 of each member extend through the aligned opening 56 in the template to the aligned gear 52 situated beneath the member. Protrusions 60 serve to connect the member to the gear such that the member rotates with the gear. The protrusions also space the member an appropriate distance from the gear such that the template does not interfere with the rotation of the member.

Figure 4:
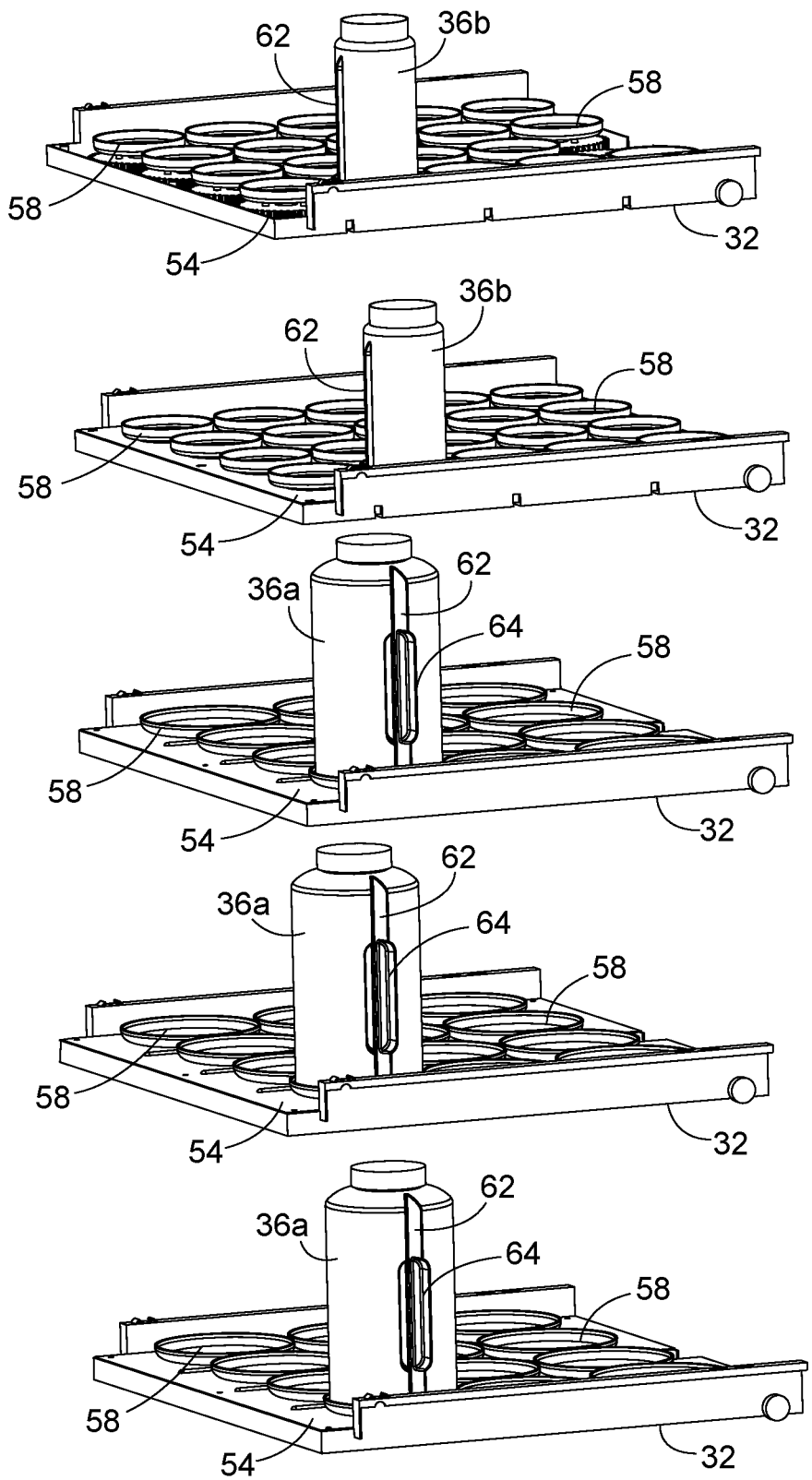
FIG. 4 is a perspective view of the shelves of the apparatus with beverage bottles situated thereon.

FIG. 4 shows the five shelves 32 fully assembled with the gears 52, template 54 and bottle support members 58. This figure also shows beverage bottles 36, one of which is situated on a bottle support member 58 on each shelf. In use, one bottle 36 could be provided for each member 58.

Bottles of different sizes are illustrated. The three bottles 36a on the lower shelves are larger capacity bottles than the bottles 36b on the two upper shelves. The size and number of the gears 52 and members 58 on each shelf is determined by the size of the bottles to be supported on that shelf.

Each bottle 36 has at least one radially extending protrusion or fin 62. The fin is used to "key" or lock the bottle on its support member such that the bottle cannot rotate relative to its support member as the support member is rotated by its aligned gear. The larger bottles 36a may be provided with a handle 64 to facilitate gripping of the bottle by the fingers of the user. The smaller bottles 36b can be held without handles because the diameter of the bottle is small enough that the bottle may be securely gripped by wrapping the hand of the user around the body of the bottle.

Figure 8:
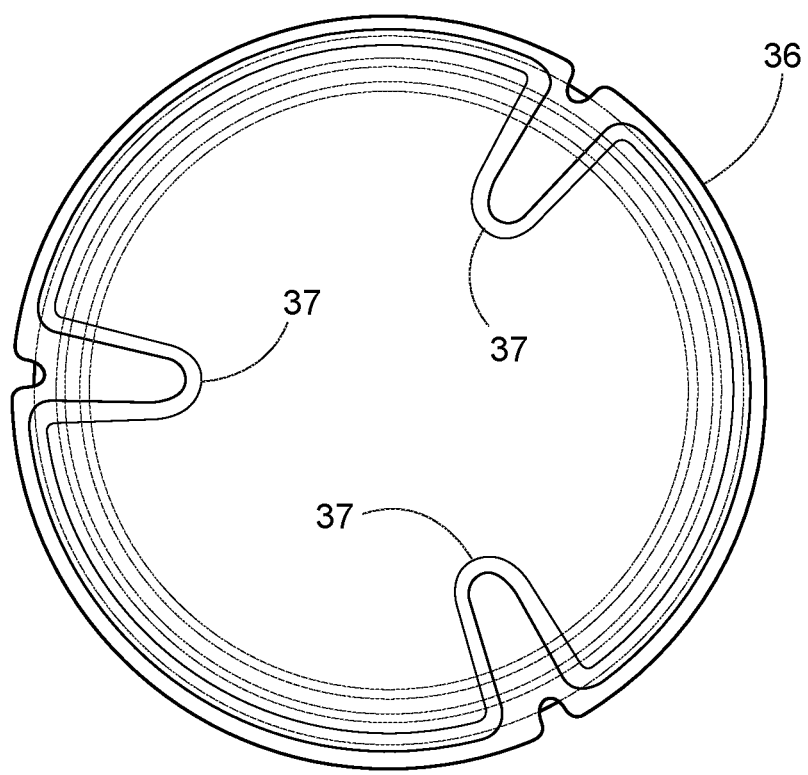
FIG. 8 is a top plan view of a beverage bottle showing the internal baffles.

Further, as illustrated in FIG. 8, each beverage bottle 36 includes one or more internal baffles 37 extending from the interior surface of the bottle. In the figure, three spaced baffles are shown. Baffles 37 serve to increase the agitation of the beverage in the bottle as the bottle is being rotated.

Figure 5:
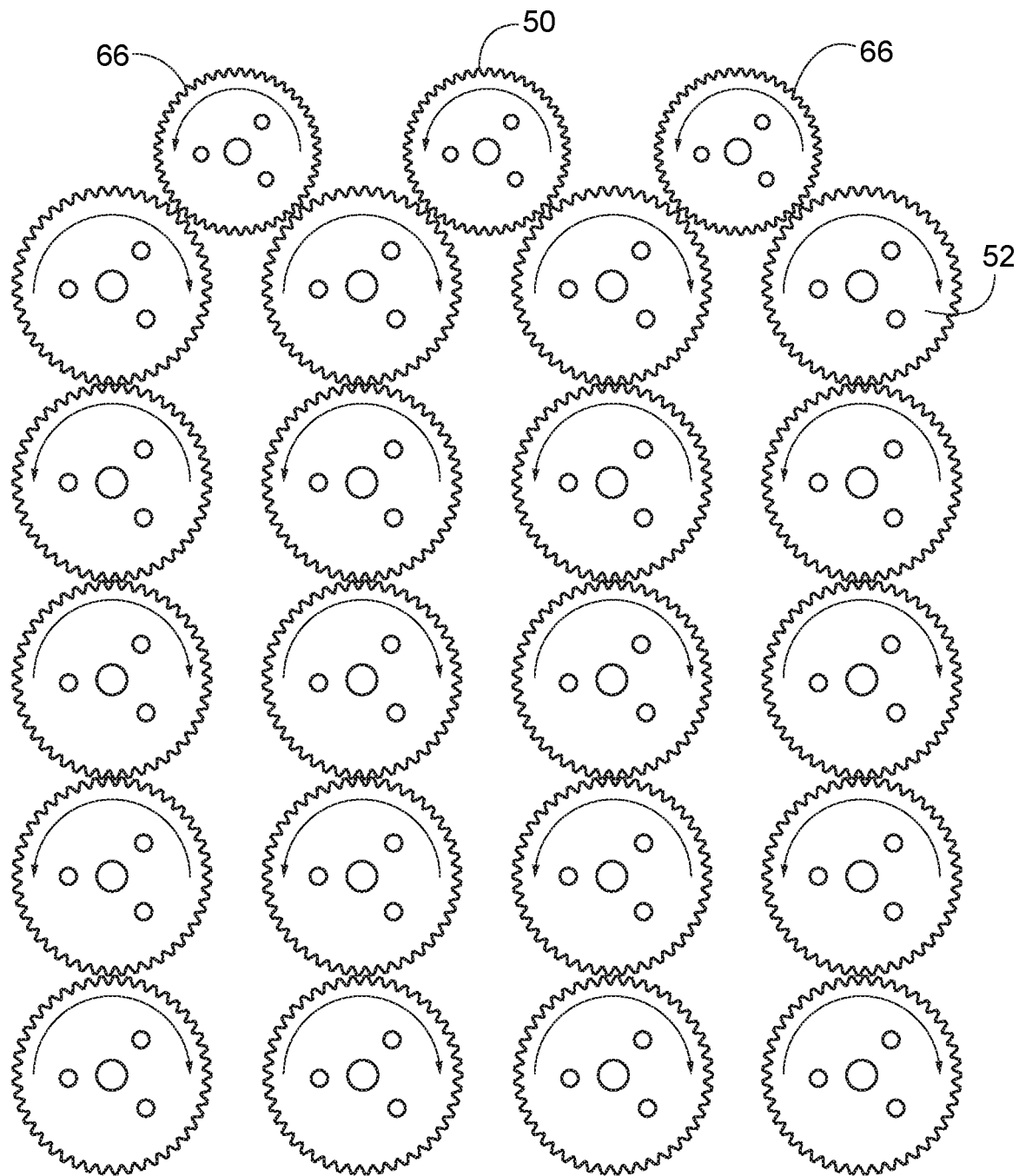
FIG. 5 is a top plan view of a complete gear set for a shelf.

FIG. 5 shows the layout of the gears 52 in greater detail. A drive gear 50 is provided to drive all of the gears 52 located on a shelf. The shelf is slideably mounted within the enclosure. When the shelf is inserted towards the rear wall as far as possible, the drive gear will be directly connected to the rear most gear in each of the inner gear sets to drive the gears of the inner gear sets. However, when the shelf is moved forward, the drive gear will disengage from the gears 52, such that the gears are no longer driven to rotate.

Within each gear set, adjacent gears will rotate in opposite directions. For example, if the drive gear 50 is rotated in the counter-clockwise direction, the rear most gear in each inner gear set which engage the drive gear will be driven to rotate in the clockwise direction. The adjacent gear in that gear set will rotate in the counter-clockwise direction and so on.

The outer gear sets are connected to the inner gear sets by connecting gears 66. Like the inner gear sets, if the connecting gears 66 are rotating in the clockwise direction, the rear most gear in each of the outer gear sets with rotate in the counter-clockwise direction, the adjacent gear in that gear set will rotate in the clockwise direction and so on.

Figure 6:
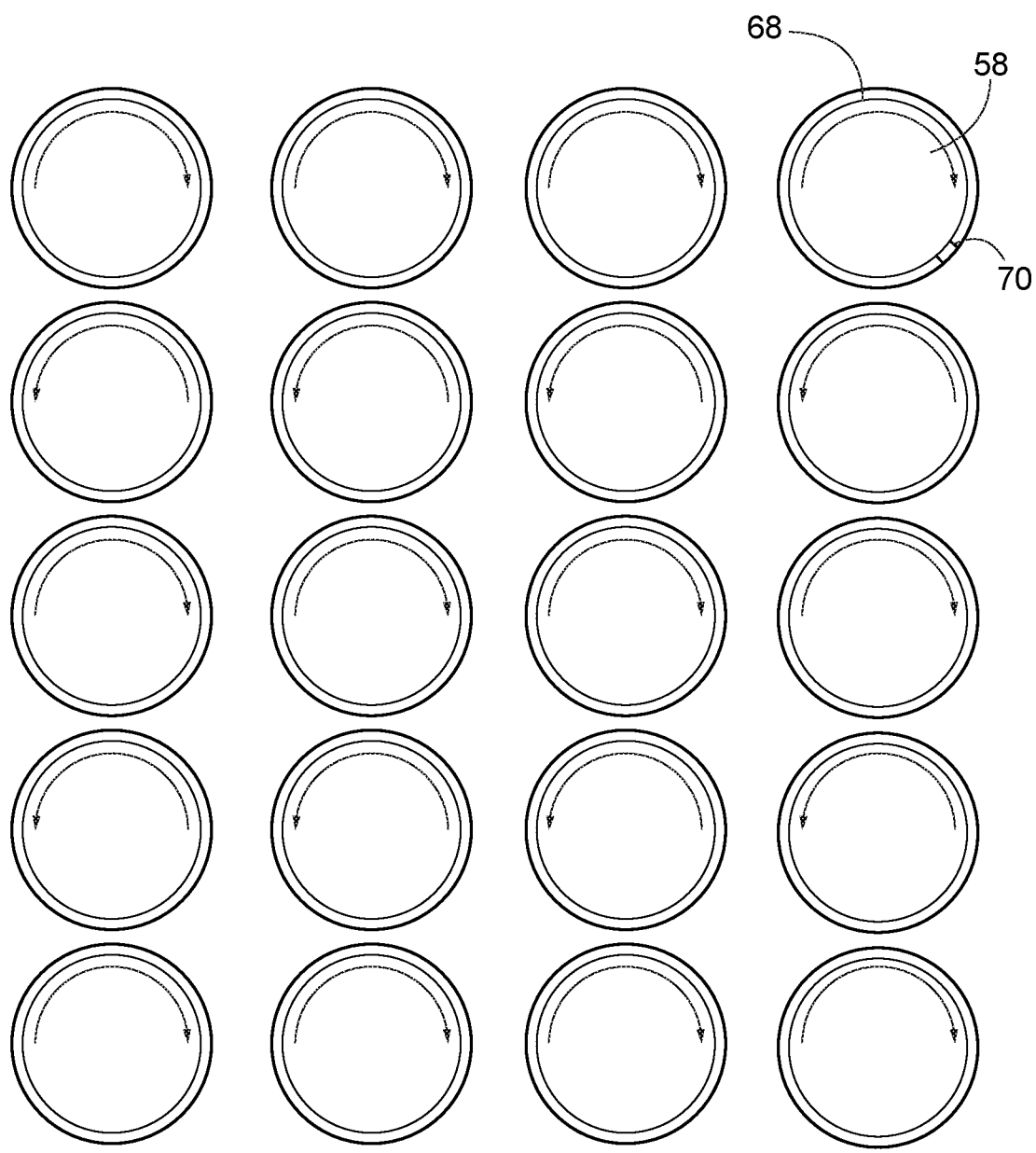
FIG. 6 is a top plan view of a complete set of coaster-shaped bottle support members for a shelf.

FIG. 6 shows the layout of the bottle support members 58. Each of the bottle support members has coaster-like shape including a raised lip 68 which defines the circular area upon which the bottom of the bottle will rest. The lip 68 of each member has a recess 70. The recess is shaped to receive the fin 62 of the bottle.

Figure 7:
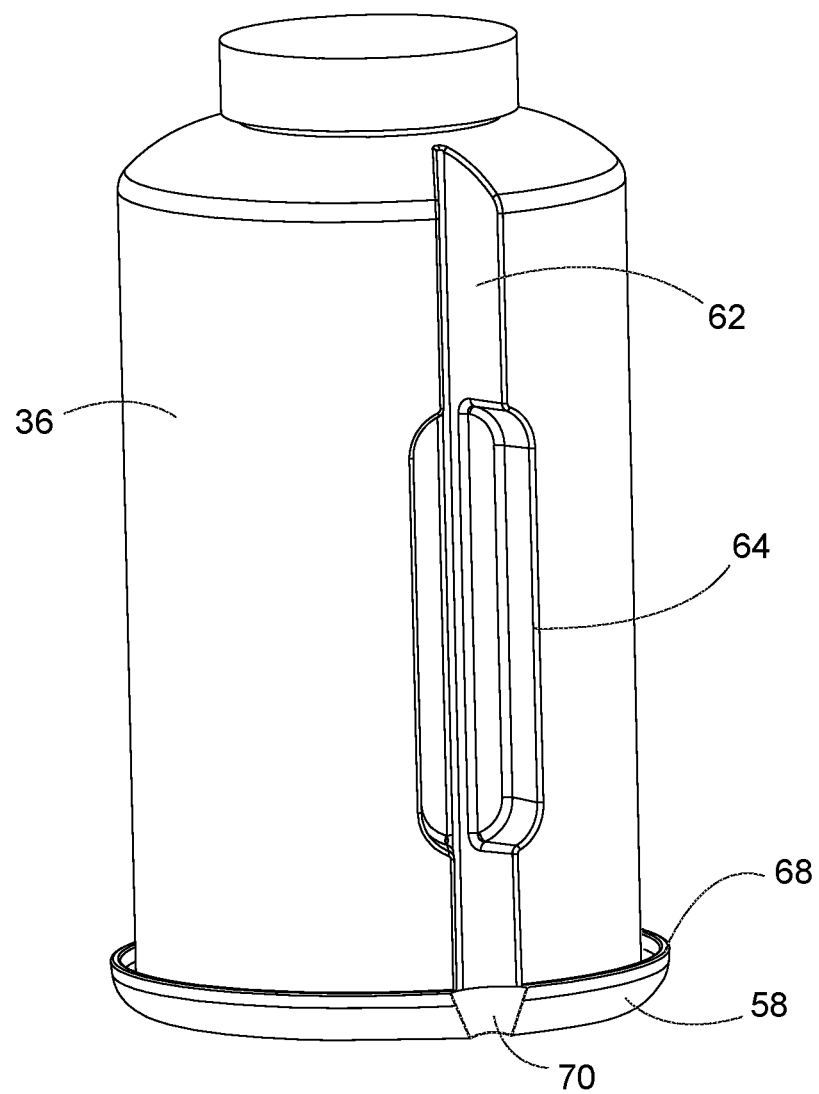
FIG. 7 is a perspective view of a beverage bottle designed for use with the apparatus.

For a bottle to be properly seated in the support member, the bottle must be oriented such that its fin 62 is aligned with and can be received in the recess 70. This is best seen in FIG. 7, which is a detailed view of the bottle support member 58 and of bottle 36. In particular, this figure shows how the fin 62 is received in recess 70 in lip 68 to prevent the bottle from rotating relative to the member, as the member is rotated. Accordingly, when properly seated in the support member, the bottle will rotate with the support member as it is rotated by the aligned gear. While only one fin and recess set is shown, several spaced fin/recess sets can be employed.

Figure 9:
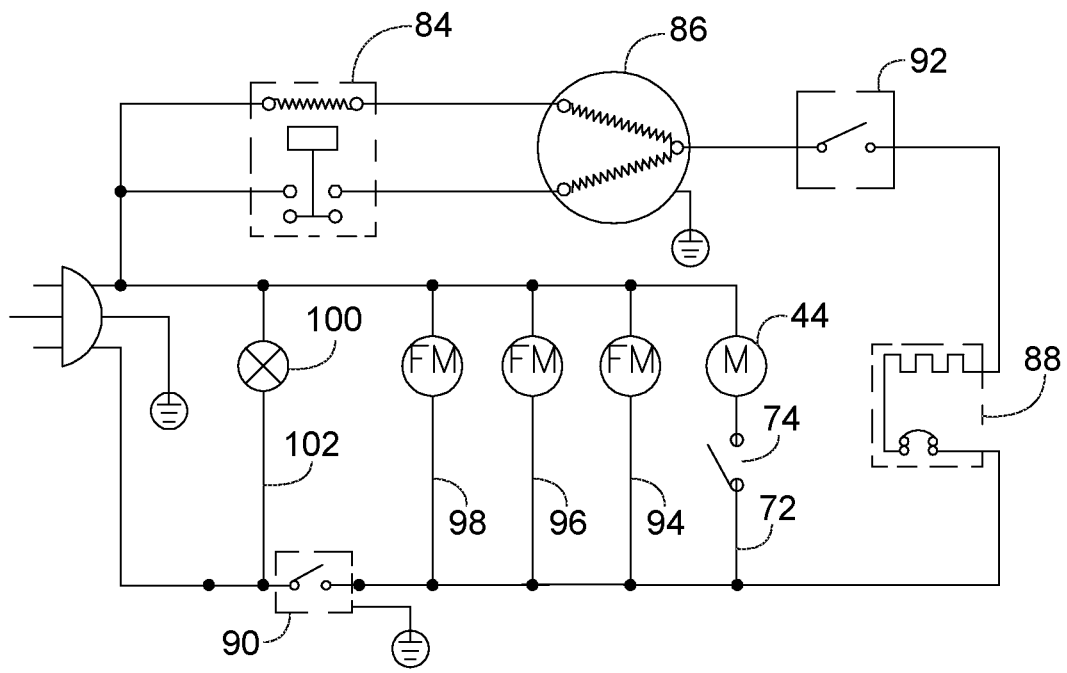
FIG. 9 is a schematic diagram of the circuitry of the apparatus.

FIG. 9 is a schematic diagram of the main circuitry of the apparatus. This circuitry is similar to the circuitry of a conventional freezer of this type with the exception that it includes a branch 72 for controlling gear motor 44. Branch 72 includes a switch 74 which when closed provides power to the gear motor 44. Motor 44 can be any uni-directional AC motor which can be regulated, with or without the proper gearing, to rotate drive shaft 48 at the appropriate speed.

Figure 10:
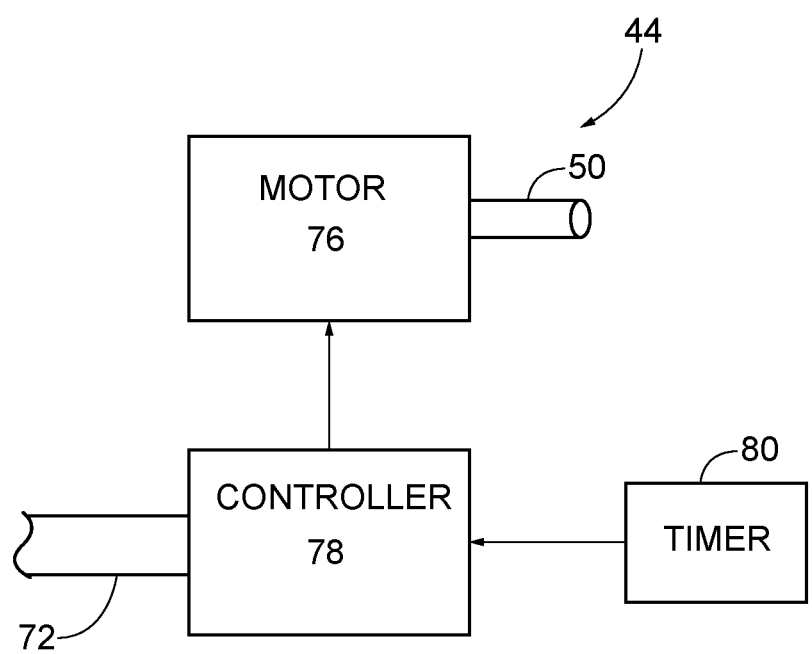
FIG. 10 is a block diagram of a reversible motor and control circuitry for repeatedly causing the beverage bottle to rotate in one direction and then in the opposite direction.

In one preferred embodiment, depicted in FIG. 10, motor 44 can be replaced by a reversible motor 76. Motor 76 is coupled to a control circuit 78. These components are substituted in branch 72 of the main freezer circuitry. Circuit 78 regulates the speed and direction of the motor output.

Motor 76 could be a World K Series Reversible AC Gear Motor available from Oriental Motor U.S.A. Corp. of Braintree, Mass. 02184. Control circuit 78 could be an ES01/ES02 AC Motor Controller from Oriental Motor.

Motor control circuit 78 may include, or be connected to, a timer 80 which can be set to periodically and repeatedly change the direction of motor 76, for example, every 3 to 5 seconds. That will cause each bottle to repeatedly rotate in one direction for a few seconds and then reverse direction and rotate in the opposite direction for a few seconds, for as long as power is supplied to the motor through circuit branch 72. This causes the beverage in each bottle to be continuously agitated such that it cannot freeze even though the temperature in the enclosure is at or below the freezing point of the beverage.

Referring again to FIG. 9, power is supplied to the freezer components through plug 82 which is connected to the starter 84 of compressor 38, in particular to the coils 86 of the compressor. An overload detector 88 is provided in the circuit to protect the compressor.

A thermostat 90 situated within the freezer enclosure is set to a temperature at or below the freezing point of the beverage in the bottles. The thermostat will cause the compressor 38 to turn on to cool the enclosure when required, as long as door 12 is closed.

A switch 92 is associated with the door 12. If the door is opened while the compressor 38 is running, switch 92 it will automatically shut off the compressor until the door is closed.

Circuit branches 94 and 96 provide power to the condenser motors. Circuit branch 98 provides power to fan motor 28. The light 100 located within the enclosure is powered by circuit branch 102.

It will now be understood that the apparatus of the present invention maintains a beverage in a beverage container in a semi-frozen or "slushy" state, such that it is always immediately available for sale and consumption. This is accomplished by keeping the beverage at a temperature at or below the freezing point of the beverage and continually agitating the beverage by rotating the beverage container.

The apparatus includes an enclosure and means for maintaining the interior of the enclosure at a temperature equal to or less than the freezing point of the beverage. A motor is provided which is controlled to continually rotate the beverage containers. In one embodiment, the motor is a reversible motor which operates in one direction for a short period of time and then changes direction to rotate in the opposite direction.

A shaft is connected to and rotated by the motor to transfer the motor output to sets of gears located on the shelves in the enclosure. The gears sets each include one or more sets of aligned interconnected gears. A drive gear, mounted to and moveable with the shaft, is connected to one of the gears in the set to rotate the gears in the set.

A coaster-shaped member is associated with each gear. The member supports a bottle containing the beverage. The bottle is locked to and moves with the member, as the member is rotated by the associated gear.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims:

I claim:

1. Apparatus for maintaining a beverage in a container in a semi-frozen state comprising an enclosure, means for maintaining the interior of the enclosure at a temperature equal to or less than the freezing point of the beverage, a motor, a motor control circuit, a shaft connected to and rotated by said motor, gear means connected to and rotated by said shaft, and a container moveable with said gear means adapted to contain the beverage, wherein said motor control circuit causes said motor to automatically rotate said shaft first in one direction and then in the reverse direction to continuously agitate the beverage in the container, wherein said gear means comprises a first set of aligned interconnected gears and a second set of aligned interconnected gears and further comprising a drive gear mounted to and moveable with said shaft, said drive gear being connected to one of the gears in each set to drive said gears in each set.

2. The apparatus of claim 1 wherein said gear means comprises a set of aligned interconnected gears.

3. The apparatus of claim 2 further comprising a drive gear mounted to and moveable with said shaft, said drive gear being connected to one of the gears in said set to drive said gears in said set.

4. The apparatus of claim 3 further comprising a coaster-shaped member mounted on and moveable with one of said gears in said set, said member being adapted to support said beverage container.

5. The apparatus of claim 1 wherein said gear means comprises a first set of aligned interconnected gears, a second set of aligned interconnected gears and a connecting gear connecting one of the gears in said first set of gears and one of the gears in said second set of gears.

6. The apparatus of claim 5 further comprising a drive gear mounted to and moveable with said shaft, said drive gear being connected to one of the gears in one of said sets to drive said gears in each set.

7. The apparatus of claim 1 wherein said gear means comprises first gear means comprising a first set of aligned interconnected gears, a second set of aligned interconnected gears and a connecting gear connecting one of the gears in said first set of gears of the first gear means and one of the gears in said second set of gears of the first gear means, and second gear means comprising a first set of aligned interconnected gears, a second set of aligned interconnected gears and a connecting gear connecting one of the gears in said first set of gears of the second gear means and one of the gears in said second set of gears of the second gear means.

8. The apparatus of claim 1 further comprising a coaster-shaped member mounted on and moveable with said gear means, said member being adapted to support said beverage container.

9. The apparatus of claim 8 wherein said beverage container comprises a bottle.

10. The apparatus of claim 9 further comprising means for preventing said bottle from rotating relative to said member.

11. The apparatus of claim 1 wherein said beverage container comprises at least one internal baffle.

12. The apparatus of claim 1 wherein said enclosure has a door and further comprising means for shutting off said motor when said door is not closed.

13. The apparatus of claim 1 further comprising a shelf, wherein said gear means is mounted on said shelf.

14. The apparatus of claim 1 wherein said motor is a reversible motor.

15. Apparatus for maintaining a beverage in a container in a semi-frozen state comprising an enclosure, means for maintaining the interior of the enclosure at a temperature equal to or less than the freezing point of the beverage, a motor, a motor control circuit, a shaft connected to and rotated by said motor, gear means connected to and rotated by said shaft, and a container moveable with said gear means adapted to contain the beverage, wherein said motor control circuit causes said motor to automatically rotate said shaft first in one direction and then in the reverse direction to continuously agitate the beverage in the container, wherein said gear means comprises first gear means comprising a first set of aligned interconnected gears, a second set of aligned interconnected gears and a connecting gear connecting one of the gears in said first set of gears of the first gear means and one of the gears in said second set of gears of the first gear means, and second gear means comprising a first set of aligned interconnected gears, a second set of aligned interconnected gears and a connecting gear connecting one of the gears in said first set of gears of the second gear means and one of the gears in said second set of gears of the second gear means, further comprising a drive gear mounted to and moveable with said shaft, said drive gear being connected to one of the gears in one of said sets of one of said first gear means and second gear means to drive said gears in each set.

16. Apparatus for maintaining a beverage in a container in a semi-frozen state comprising an enclosure, means for maintaining the interior of the enclosure at a temperature equal to or less than the freezing point of the beverage, a motor, a motor control circuit, a shaft connected to and rotated by said motor, gear means connected to and rotated by said shaft, and a container moveable with said gear means adapted to contain the beverage, wherein said motor control circuit causes said motor to automatically rotate said shaft first in one direction and then in the reverse direction to continuously agitate the beverage in the container, further comprising means for preventing said bottle from rotating relative to said member wherein said beverage container comprises a bottle, further comprising a coaster-shaped member mounted on and moveable with said gear means, said member being adapted to support said beverage container, wherein said rotation preventing means comprises a protrusion on one of said member and said bottle, and a recess adapted to receive said protrusion on the other of said member and said bottle.

17. Apparatus for maintaining a beverage in a semi-frozen state comprising an enclosure, means for maintaining the interior of the enclosure at a temperature equal to or less than the freezing point of the beverage, a motor, a shaft connected to and rotated by said motor, gear means comprising a first gear means comprising a first set of aligned interconnected gears, a second set of aligned interconnected gears and a connecting gear connecting one of the gears in said first set of gears of said first gear means and one of the gears in said second set of gears of said first gear means, and second means comprising a first set of aligned interconnected gears, a second set of aligned interconnected gears and a connecting gear connecting one of the gears in said first set of gears of said second gear means and one of the gears in said second set of gears of said second gear means, a drive gear mounted to and moveable with said shaft, said drive gear being connected to one of the gears in one of said sets to drive said gears in each set, and a container adapted to retain the beverage moveable with said gear means, wherein said motor continuously rotates said container to agitate the beverage.

18. Apparatus for maintaining a beverage in a container in a semi-frozen state comprising an enclosure, means for maintaining the interior of the enclosure at a temperature equal to or less than the freezing point of the beverage, a motor, a shaft connected to and rotated by said motor, gear means connected to and rotated by said shaft, and a container moveable with said gear means adapted to contain the beverage, wherein said motor rotates said gear means to continuously agitate the beverage in the container, wherein said gear means comprises a first set of aligned interconnected gears and a second set of aligned interconnected gears, further comprising a drive gear mounted to and moveable with said shaft, said drive gear being connected to one of the gears in each set to drive said gears in each set.

19. Apparatus for maintaining a beverage in a container in a semi-frozen state comprising an enclosure, means for maintaining the interior of the enclosure at a temperature equal to or less than the freezing point of the beverage, a motor, a shaft connected to and rotated by said motor, gear means connected to and rotated by said shaft, and a container moveable with said gear means adapted to contain the beverage, wherein said motor rotates said gear means to continuously agitate the beverage in the container, wherein said gear means comprises first gear means comprising a first set of aligned interconnected gears, a second set of aligned interconnected gears and a connecting gear connecting one of the gears in said first set of gears of the first gear means and one of the gears in said second set of gears of the first gear means, and second gear means comprising a first set of aligned interconnected gears, a second set of aligned interconnected gears and a connecting gear connecting one of the gears in said first set of gears of the second gear means and one of the gears in said second set of gears of the second gear means, further comprising a drive gear mounted to and moveable with said shaft, said drive gear being connected to one of the gears in one of said sets of one of said first gear means and second gear means to drive said gears in each set.

20. Apparatus for maintaining a beverage in a container in a semi-frozen state comprising an enclosure, means for maintaining the interior of the enclosure at a temperature equal to or less than the freezing point of the beverage, a motor, a shaft connected to and rotated by said motor, gear means connected to and rotated by said shaft, and a container moveable with said gear means adapted to contain the beverage, wherein said motor rotates said gear means to continuously agitate the beverage in the container, a coaster-shaped member mounted on and moveable with said gear means, said member being adapted to support said beverage container, wherein said beverage container comprises a bottle, means for preventing said bottle from rotating relative to said member, wherein said rotation preventing means comprises a protrusion on one of said member and said bottle, and a recess adapted to receive said protrusion on the other of said member and said bottle.

* * * * *